Patented Sept. 1, 1953

2,650,938

UNITED STATES PATENT OFFICE 2,650,938

METHOD OF SEPARATING OPTICAL ISOMERS

Alexander Gero, Media, Pa.

No Drawing. Application December 2, 1947, Serial No. 789,321

2 Claims. (Cl. 260—570.6)

This invention relates generally to compounds having optical activity and more particularly to a method for separating from each other the enantiomorphs of such optically active compounds.

While optically active compounds occur in nature usually in the form of a single isomer, synthesis of such compounds always yields a mixture, known as racemic, containing equal amounts of enantiomorphs. The present invention has as one of its principal objects the separation of a single enantiomorph from a racemic mixture thereof by a method which is simple and easy to carry out in practice and which avoids the difficulties and the waste of time and materials inherent in previously known methods of optical resolution.

Prior to the present invention, the only known practical method for resolving mixtures of enantiomorphs has been to react such mixture with one enantiomorph of an optically active compound, thus forming two compounds neither of which is an enantiomorph of the other. Instead, such compounds are diastereoisomers, in view of which they may be separated by fractional crystallization. This known method of optical resolution is subject to certain drawbacks, the first of which is that it requires the aid of an appropriate optically active compound, the available number of such compounds being limited, while the diastereoisomers which they form with the compound to be resolved are not always ideally suited for crystallization. In the second place, diastereoisomers obtained by the known method of reacting a mixture of enantiomorphs with one enantiomorph of an optically active compound differ so slightly in their solubilities as to make their separation by fractional crystallization exceedingly difficult, tedious and wasteful of time and material.

The real problem in optical resolution is, therefore, not how to start the resolution on a racemic mixture, but how to progress from a mixture of somewhat unequal amounts of the enantiomorphs to the increasing enrichment and eventual complete separation of at least one of the enantiomorphs.

Having in mind the foregoing problem, it may be stated that the method of the present invention is based upon my discovery that when both enantiomorphs are present in unequal amounts in a solution of an optically active compound and a fraction only of the total compound is precipitated therefrom, the composition of the precipitate is different from that of the original total solution as well as from that of the unprecipitated fraction of said solution, the precipitated fraction containing a greater proportion of the particular isomer which predominated in the original solution, while the unprecipitated fraction contains a lesser proportion of said particular isomer.

This phenomenon forming the basis of my invention may be mathematically represented as follows:

Assuming a solution containing $x$ grams of A enantiomorph and $y$ grams of B enantiomorph, wherein $x$ is greater than $y$, upon precipitating from such solution $z$ grams of the total solute comprising the mixture of A and B, $z$ being a fraction of the total solute, it will be found that the precipitate will contain $x'$ grams of A and $y'$ grams of B with the ratio $x'/y'$ greater than the ratio $x/y$, whereas in the unprecipitated fraction of the solute, the isomers A and B are present in the ratio of $x-x'/y-y'$, such ratio being less than that of $x/y$. The extent to which the ratio $x'/y'$ exceeds the ratio $x/y$ is not always constant and may vary even under identical conditions.

While no theoretical interpretation can at present be offered to explain the foregoing phenomenon, experiment has demonstrated it to be a fact.

The practical value of the fundamental principle which I prefer to describe as resolution of enantiomorphs by fractional precipitation as distinguished from fractional crystallization of diastereoisomers becomes immediately apparent. First, such method of resolution dispenses with the necessity of employing any additional optically active compounds once partial resolution has been effected. Thus, having once effected partial resolution of the racemic mixture to establish unequality in the amounts of the enantiomorphs present therein, it becomes possible by the method of the present invention to choose freely the conditions most appropriate to precipitate a fraction of the nonracemic mixture from its original solution.

In general, any partial conversion of the compound from a soluble to an insoluble form or derivative will achieve the purpose. Thus, where the compound to be resolved is an insoluble base but forms soluble salts, it will be convenient to add to a solution of any one of its salts just enough alkali to precipitate part of the base; or if it forms insoluble salts with certain acids, just enough of such an acid may be added to convert part of the base into the insoluble salt. Conversely, if the compound to be resolved is an insoluble acid and forms soluble salts, it may be fractionally precipitated from the solution of one of its salts by adding a quantity of a strong acid insufficient to precipitate the total amount of the acid to be resolved; or if it forms insoluble salts with certain bases, just enough of such a base may be added to convert part of the acid into the insoluble salt.

If the compound to be resolved forms an insoluble complex with another compound, an insufficient quantity of such other compound may be used in the same way as the base was used above to form an insoluble salt with an acid to be resolved. Furthermore, fractional precipitation may take advantage of the difference in solubility of the compound to be resolved in different solvents or in one solvent at different temperatures by changing the composition of the solvent or the temperature so as to induce partial precipitation. Thus, considerable liberty is afforded in choosing conditions for the enrichment of the predominant enantiomorph and very often it will be possible to carry out each step of enrichment in a matter of minutes. A sufficient number of steps will eventually lead to the preparation of a pure enantiomorph, by applying the process of fractional precipitation each time to the enriched fraction of the previous step. Furthermore, conditions may be found in which the enrichment goes on in greater steps than would be possible even under the best conditions according to the conventional method. Complete separation of one enantiomorph can, therefore, be arrived at in fewer, faster and more economical steps than heretofore.

The change in the composition of the mixture of enantiomorphs arrived at by fractional precipitation depends largely on how much of the total amount present is precipitated. If only a little is precipitated, the predominant enantiomorph will predominate much more than originally; if much is precipitated the difference will be less. In either case the fraction remaining in solution will not only be impoverished in respect to the originally predominant enantiomorph, but it is even possible to reverse the predominance in what remains in solution, i. e., to precipitate fractionally in such a way that using the terms of the above formulation of the principle of fractional precipitation of optical antipodes, $x'$ will be less than $y'$ where $x$ had been greater than $y$. If, then, the same method of fractional precipitation is applied to the filtrate as had been first applied to the original solution, enantiomorph B will now be enriched instead of enantiomorph A.

This introduces several further great advantages over known methods of optical resolution. In most cases where optical resolution is of practical interest only one of the enantiomorphs is of value, the other being useful only if capable of being racemized and subjected again to resolution. The method of fractional precipitation is actually able to put the undesired enantiomorph to work by dissolving it together with the racemic compound as obtained by synthesis and conducting a fractional precipitation so that reversal of predominance occurs in what remains dissolved; that is, the desired enantiomorph predominates now in the solution and may be enriched by fractional precipitation. Thus two further advantages are achieved; first, not only does this utilization of the undesired enantiomorph obviate the necessity of racemization and the attendant loss, but also, second, it eliminates the need of using any helper compound other than the undesired enantiomorph even for the initial partial resolution of the racemic mixture. While, therefore, as stated earlier, my invention is designed primarily to operate only on partially resolved mixtures of enantiomorphs by increasing the proportion of the enantiomorph already predominant, it is apparent that it can be made to operate also on racemic mixtures by converting them into non-racemic ones by the addition of the undesired enantiomorph and the reversing the optical activity of the mixtures.

Furthermore, the present invention makes it possible to prepare either enantiomorph in a pure state. This is impossible when the difference in solubilities of diastereoisomers is used for resolution because there only the less soluble derivative is finally obtained pure, not the more soluble one. However, in the mother liquors of such a resolution, the more soluble derivative predominates and, therefore, it can be subjected to fractional precipitation for preparation of the other enantiomorph. The value of this method is readily seen for such cases where the desired enantiomorph appears in the more soluble fraction.

The following examples illustrate in a practical way the principle of resolution by fractional precipitation:

EXAMPLE I

*Fractional precipitation of an insoluble base from a soluble salt*

Convert racemic epinephrine into the acid tartrate as described by Flächer (Zeitschr. f. physiol, Chemie, vol. 58, p. 189). Dissolve the tartrate cake in water and precipitate the epinephrine base with an excess of ammonia. This epinephrine base will be found to average about 70% l-epinephrine and 30% d-epinephrine. Dissolve 100 parts of this epinephrine base in a solvent comprising 1000 parts of water and 50 parts of concentrated hydrochloric acid. To this strongly acid solution, add 10% ammonia until the pH is brought up to 6, at which point no epinephrine has yet been precipitated. Then with constant stirring add slowly a mixture of 16 parts of concentrated ammonia and 160 parts of distilled water, this amount of ammonia being merely sufficient to effect a fractional precipitation of the total epinephrine present in the solution. The epinephrine precipitates rapidly and is filtered after a short while. It is found to consist of about 85% l-epinephrine and 15% d-epinephrine. Thereafter, the process is repeated as often as necessary until the final fractional precipitation yields substantially pure l-epinephrine. Usually this result is effected in one or two additional operations of fractional precipitation as above described.

EXAMPLE II

*Fractional precipitation of an insoluble salt from a soluble base*

Dissolve 54 grams of amphetamine containing 66% of the l-base and 34% of the d-base in a mixture of 100 ml. 95% alcohol and 20 ml. water. Then with constant stirring, add a mixture of 5 grams concentrated sulphuric acid and 20 ml. water. Crystallization sets in rapidly and the solid is filtered as soon as the whole mixture is completely cold. The precipitated fraction (one fourth of the whole) contains about 79% of the l-base and 21% of the d-base, while the fraction remaining in solution contains 64% of the l-base and 36% of the d-base. As in Example I, the process is repeated as often as necessary so that upon final fractional precipitation the yield of the l-base is substantially pure.

EXAMPLE III

*Fractional precipitation of an insoluble salt from a soluble acid*

Dissolve 10 grams of tartaric acid, which contains 75% of the d-isomer and 25% of the l-isomer, in 25 ml. of water. Then add a mixture of 5.55 ml. three-molar potassium hydroxide solution and 7 ml. water. Allow to stand overnight, then filter. The potassium salt thus prepared contains tartaric acid with about 88% d-acid and 12% l-acid while the acid still in solution contains about 71% d-acid and 29% l-acid. As in the previous examples, the fractional precipitation is repeated until a final yield of substantially pure d-acid is obtained.

EXAMPLE IV

*Reversal of rotation*

Dissolve 51 grams of epinephrine which contains 55% l-epinephrine and 45% d-epinephrine in enough dilute hydrochloric acid to obtain complete dissolution. Then add enough dilute sodium hydroxide solution to neutralize one quarter of the acid used, thereby obtaining precipitation of only one quarter of the epinephrine. About 11 grams of epinephrine precipitate and are found to contain about 85% l-epinephrine and 15% d-epinephrine. The filtrate, however, is dextro-rotary, and on further precipitating out another 11 grams of base, this base contains about 77% d-epinephrine and 23% l-epinephrine. As in the previous examples, the fractional precipitation is repeated until a final yield of substantially pure d-epinephrine is obtained.

EXAMPLE V

*Fractional precipitation combined with the conventional method of resolution*

Convert racemic epinephrine into the acid tartrate as in Example I. Dissolve the crystal cake (which contains about 70% l-epinephrine and 30% d-epinephrine) in water and determine its exact epinephrine content by precipitating a known fraction of the solution with excess ammonia or sodium bicarbonate solution. Then bring the pH of the solution to 6 and add an amount of normal sodium hydroxide solution equivalent to one half of the total amount of epinephrine present. Filter the precipitate after a short while to yield a product containing about 90% l-epinephrine, a result which by known methods (repeated recrystallization of the tartrate cake) requires at least six more operations than are involved in the procedure of the present invention. By one or more fractional precipitations, a yield of substantially pure l-epinephrine may be obtained.

What is claimed as new and useful is:

1. In a method of optically resolving a mixture of enantiomorphs of a soluble salt of epinephrine containing a greater amount of one enantiomorph than the other, the step of adding to a solution of said mixture an amount of alkali sufficient to precipitate a fraction only of the total epinephrine present in said solution to yield a precipitate having an increased percentage of the particular enantiomorph which predominated in the initial mixture, in then dissolving said precipitate in an acid, in thereafter again adding to said last-obtained solution an amount of alkali sufficient to precipitate a fraction only of the epinephrine contained in said last-obtained solution, and in repeating such cycle of operations until the end resultant product consists of the originally predominating enantiomorph in substantially pure state.

2. In a method of optically resolving a mixture of enantiomorphs of amphetamine containing a greater amount of one enantiomorph than the other, the step of adding to a solution of said mixture sulphuric acid in such quantity as to precipitate a fraction only of the total amphetamine present to obtain in the precipitate an increased percentage of the particular enantiomorph which predominated in the initial mixture, in then liberating the amphetamine from said precipitate by the addition of excess alkali to said precipitate, in thereafter again adding to a solution of said last-obtained amphetamine sulphuric acid, to form with said last-obtained amphetamine an insoluble salt, in an amount sufficient to precipitate a fraction only of said last-obtained amphetamine, and in repeating such cycle of operations until the end resultant product consists of the originally predominating enantiomorph in substantially pure state.

ALEXANDER GERO.

References Cited in the file of this patent

UNITED STATES PATENTS

| Number | Name | Date |
| --- | --- | --- |
| 1,044,778 | Gruttefein | Nov. 19, 1912 |
| 2,264,928 | Blagden et al. | Dec. 2, 1941 |
| 2,276,508 | Nabenhauer | Mar. 17, 1942 |
| 2,276,509 | Nabenhauer | Mar. 17, 1942 |
| 2,382,288 | Braun et al. | Aug. 14, 1945 |
| 2,429,166 | Miescher et al. | Oct. 14, 1947 |

OTHER REFERENCES

Curtman, L. J., "Qual. Chem. Anal." (1932) pp. 77–8.

Pickholz, J. Chem. Soc., 1945, pp. 928–929.

Gilman, "Organic Chemistry" (John Wiley, Inc., N. Y., 1938), vol. I, pp. 187–189.